(12) United States Patent
Zhang et al.

(10) Patent No.: US 7,716,683 B2
(45) Date of Patent: May 11, 2010

(54) DISTRIBUTED GRAPHICS PROCESSING APPARATUS AND METHOD

(75) Inventors: Hansong Zhang, Cupertino, CA (US); David Shreiner, Mountain View, CA (US)

(73) Assignee: Graphics Properties Holdings, Inc., Newark, CA (US)

( * ) Notice: Subject to any disclaimer, the term of this patent is extended or adjusted under 35 U.S.C. 154(b) by 1471 days.

(21) Appl. No.: 11/027,752

(22) Filed: Dec. 30, 2004

(65) Prior Publication Data
US 2006/0146058 A1   Jul. 6, 2006

(51) Int. Cl.
*G06F 9/44* (2006.01)
*G09G 5/39* (2006.01)

(52) U.S. Cl. .......... 719/323; 719/324; 345/531

(58) Field of Classification Search ........ 719/310, 719/323, 324; 345/418, 568, 501, 502, 503, 345/522, 530, 531
See application file for complete search history.

(56) References Cited

U.S. PATENT DOCUMENTS

| | | | |
|---|---|---|---|
| 2001/0043226 A1 | 11/2001 | Visser et al. | 345/581 |
| 2004/0075623 A1 | 4/2004 | Hartman | 345/1.3 |
| 2005/0046634 A1* | 3/2005 | Stauffer et al. | 345/522 |
| 2005/0190190 A1* | 9/2005 | Diard et al. | 345/502 |
| 2005/0237330 A1* | 10/2005 | Stauffer et al. | 345/531 |
| 2006/0146057 A1* | 7/2006 | Blythe | 345/506 |
| 2006/0152518 A1* | 7/2006 | Stauffer et al. | 345/543 |
| 2006/0262124 A1* | 11/2006 | Stauffer et al. | 345/501 |
| 2006/0262127 A1* | 11/2006 | Stauffer et al. | 345/543 |
| 2007/0097132 A1* | 5/2007 | Stauffer et al. | 345/502 |

FOREIGN PATENT DOCUMENTS

WO   WO 01/92973 A   12/2001

OTHER PUBLICATIONS

Humphreys, G. et al., Humphreys, et al., Chromium: A Stream Processing Framework for Interactive Rendering on Clusters [online], [retrieved on Dec. 14, 2004]. Retrieved from the Internet <URL:http://graphics.stanford.edu/papers/cr/>, 10 pages.

Silicon Graphics, Inc., SGI OpenGL Multipipe, [online], [retrieved on Dec. 14, 2004], Retrieved from the SGI OpenGL Multipipe: Home Page and Products pages, <URL:http://www.sgi.com/products/software/multipipe/>, 10 pages.

Silicon Graphics, Inc., SGI OpenGL Vizserver, [online], [retrieved on Dec. 14, 2004], Retrieved from the SGI OpenGL Vizserver Products pages, <URL:http://www.sgi.com/products/software/vizserver/>, 28 pages.

(Continued)

*Primary Examiner*—Van H Nguyen
(74) *Attorney, Agent, or Firm*—Sunstein Kann Murphy & Timbers LLP

(57) ABSTRACT

A method and apparatus forward a hardware call from a driver to graphics hardware via a virtual connection. Specifically, the method and apparatus process graphical data in a system having the driver, which produces a hardware call for the controlling the operation of the graphics hardware. As noted above, the method and apparatus first establish the virtual connection between the driver and the graphics hardware. Next, the hardware call is forwarded to the graphics hardware via the virtual connection.

27 Claims, 8 Drawing Sheets

OTHER PUBLICATIONS

Silicon Graphics, Inc., OpenGL Vizserver™ 3.4: High-Performance Large Data Set Visualization and Multisite Collaboration over Standard Local and Wide Area Networks, [online], [retrieved on Dec. 30, 2004], Retrieved from the SGI OpenGL Vizserver Products page, <URL:http://www.sgi.com/pdfs/3112.pdf>, 15 pages.

Graphics, Inc., Remote Interactive Visualization and Collaboration, [online], [retrieved on Dec. 30, 2004], Retrieved from the SGI OpenGL Vizserver Products page, <URL: http://www.sgi.com/pdfs/3263.pdf>, 2 pages.

Chen et al., "Data Distribution Strategies for High-Resolution Displays," Computer and Graphics, Pergamon Press Ltd., Oxford, GB, vol. 25, No. 5, pp. 811-818, Oct. 2001.

International Search Report, PCT/US2005/039012, 4 pages, May 26, 2005.

* cited by examiner

US 7,716,683 B2

DISTRIBUTED GRAPHICS PROCESSING APPARATUS AND METHOD

FIELD OF THE INVENTION

The invention generally relates to graphics processing and, more particularly, the invention relates to distributed graphics processing.

BACKGROUND OF THE INVENTION

FIG. 1 schematically shows a conventional graphics system, which may be generally represented as having four functional stages. In particular, the system in FIG. 1 has a host application 10 that produces generalized function calls (e.g., complying with either of the OPENGL or DIRECT3D graphics libraries) for processing by downstream graphics hardware 12. Graphics hardware 12, however, cannot read generalized function calls. Accordingly, an intervening graphics driver 14 translates the generalized function calls to specifically formatted calls (referred to as "hardware specific calls") that can be processed by the graphics hardware 12. The graphics driver 14 then forwards the hardware specific calls to the graphics hardware 12, which generates image data for display by a display device 16 (e.g., a cathode ray tube or liquid crystal display).

The four functional stages of the graphics system shown in FIG. 1 typically communicate across some kind of hardwired connection, such as a bus or other type of special-purpose connection (i.e., schematically shown by the arrows). For example, all four stages may be within a single personal computer. To more efficiently process graphical data, however, some systems distribute the various stages across different computers.

One distributed graphics processing implementation has a host application 10 executing on a local computer, while the remaining stages execute on a virtually connected remote computer. One problem with this implementation, however, is that it requires additional overhead. Specifically, because they refer to data in local memory (which has no meaning to a remote computer), function calls generated by the host application 10 must be translated into a format that can be transferred across a network and understood by a remote computer. Software designers therefore have developed protocols that convert local function calls into transferable, remotely understandable entities, such as specific assigned values. For example, the "DRAW" command could be assigned the value of binary 0001, which subsequently is transferred across the Internet to a remote computer. This conversion process is known as "encoding" the function calls.

Of course, the remote computer must have the functionality to convert assigned values from this protocol back into a function call that can be processed by its local driver 14 (referred to as "decoding"). Accordingly, a decoder on the remote computer converts each assigned value back into a function call, which then can be used by the driver 14 to continue graphic processing.

Despite efficiencies gained by using a distributed computing solution, this implementation creates new inefficiencies. Among others, requiring a separate encoder and decoder necessarily increases both transmission latency and the number of process steps required to ultimately generate a graphical image. Such inefficiencies can negate or significantly mitigate the efficiencies of a distributed computing solution. In addition, because the host application 10 is not configured to optimize its output based upon the graphics hardware 12, the encoder simply encodes the graphics commands on the fly without making any optimizations.

SUMMARY OF THE INVENTION

In accordance with one aspect of the invention, a method and apparatus forward a hardware call from a driver to graphics hardware via a virtual connection. Specifically, the method and apparatus process graphical data in a system having the driver, which produces a hardware call for the controlling the operation of the graphics hardware. As noted above, the method and apparatus first establish the virtual connection between the driver and the graphics hardware. Next, the hardware call is forwarded to the graphics hardware via the virtual connection.

In some embodiments, the method and apparatus intercept the hardware call from the driver before forwarding it to the graphics hardware. Moreover, to facilitate forwarding, address information may be added to the hardware call. The method and apparatus further may determine the type of graphics hardware to receive the hardware call, and establish the virtual connection (e.g., across the Internet) with the graphics hardware based upon the determined type of graphics hardware.

The driver may be a part of a first device, while the graphics hardware may be a part of a second device connected to the first device by the virtual connection. The first device has local graphics hardware, which the method and apparatus bypass by forwarding the hardware call.

In accordance with another aspect of the invention, an apparatus for processing graphical data (in a system having a driver and graphics hardware) includes a call detector for detecting a hardware call produced by the driver, and a connector operatively coupled with the call detector. The connector is configured to form a virtual connection between the driver and the graphics hardware after the call detector detects a hardware call produced by the driver. The apparatus also has a call forwarder operatively coupled with the connector. The call forwarder is configured to forward the hardware call to the graphics hardware via the virtual connection.

In accordance with other aspects of the invention, a method and apparatus for processing graphical data in a system having a driver and graphics hardware establish a virtual connection between the driver and the graphics hardware, and receive the hardware call via the virtual connection. After receipt, the method and apparatus enable the graphics hardware to process the hardware call.

In some embodiments, the method and apparatus receive a query to establish the virtual connection, and determine the type of graphics hardware that is associated with the query. The graphics hardware is the determined type.

The graphics hardware may be enabled to process the hardware call in a number of different ways. Among others, the hardware call may be forwarded to the graphics hardware, or it may be stored in memory that is accessible by the graphics hardware. Moreover, in some embodiments, the method and apparatus forward a confirmation message to the driver. The confirmation message has information indicating that the graphics hardware is a specific type of graphics hardware.

The driver may be a part of a first device, while the graphics hardware may be a part of a second device connected to the first device by the virtual connection. The second device has local driver, which the method and apparatus bypass after receipt of the hardware call.

In accordance with another aspect of the invention, an apparatus for processing graphical data (in a system having a driver and graphics hardware) has a connector configured to establish a virtual connection between the driver and the graphics hardware. The apparatus also has an interface configured to receive the hardware call via the virtual connection. The graphics hardware is operatively coupled with the interface to receive the hardware call.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Illustrative embodiments of the invention eliminate the need for both an encoder and decoder in a distributed graphics process system by virtualizing the connection between the graphics hardware and its corresponding driver. Such an approach consequently has less overhead than other distributed graphics processing methods, thus improving system performance. To those ends, various embodiments directly transmit the driver produced hardware calls (e.g., programmed I/O and DMA accesses to graphics hardware), which can be readily understood by the remotely located graphics hardware. Details of various embodiments are discussed below.

Figure 1:
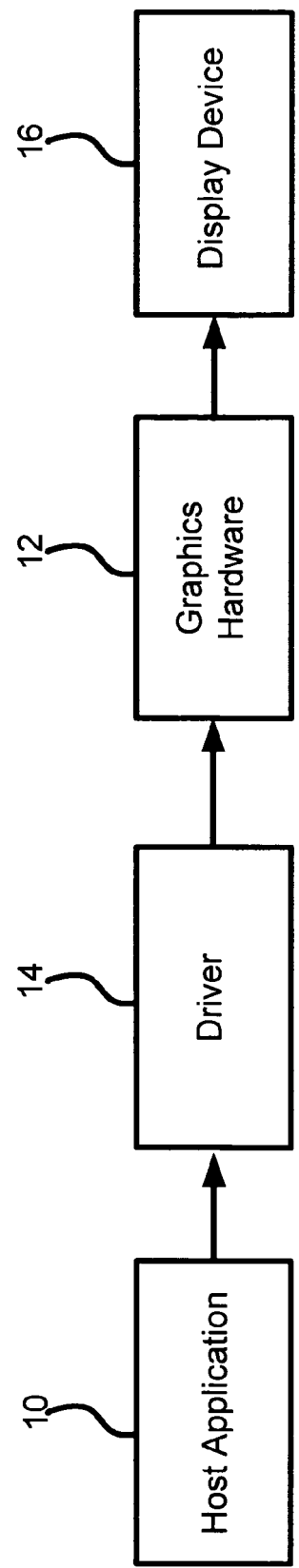
FIG. 1 schematically shows a prior art graphics processing system.
Figure 2:
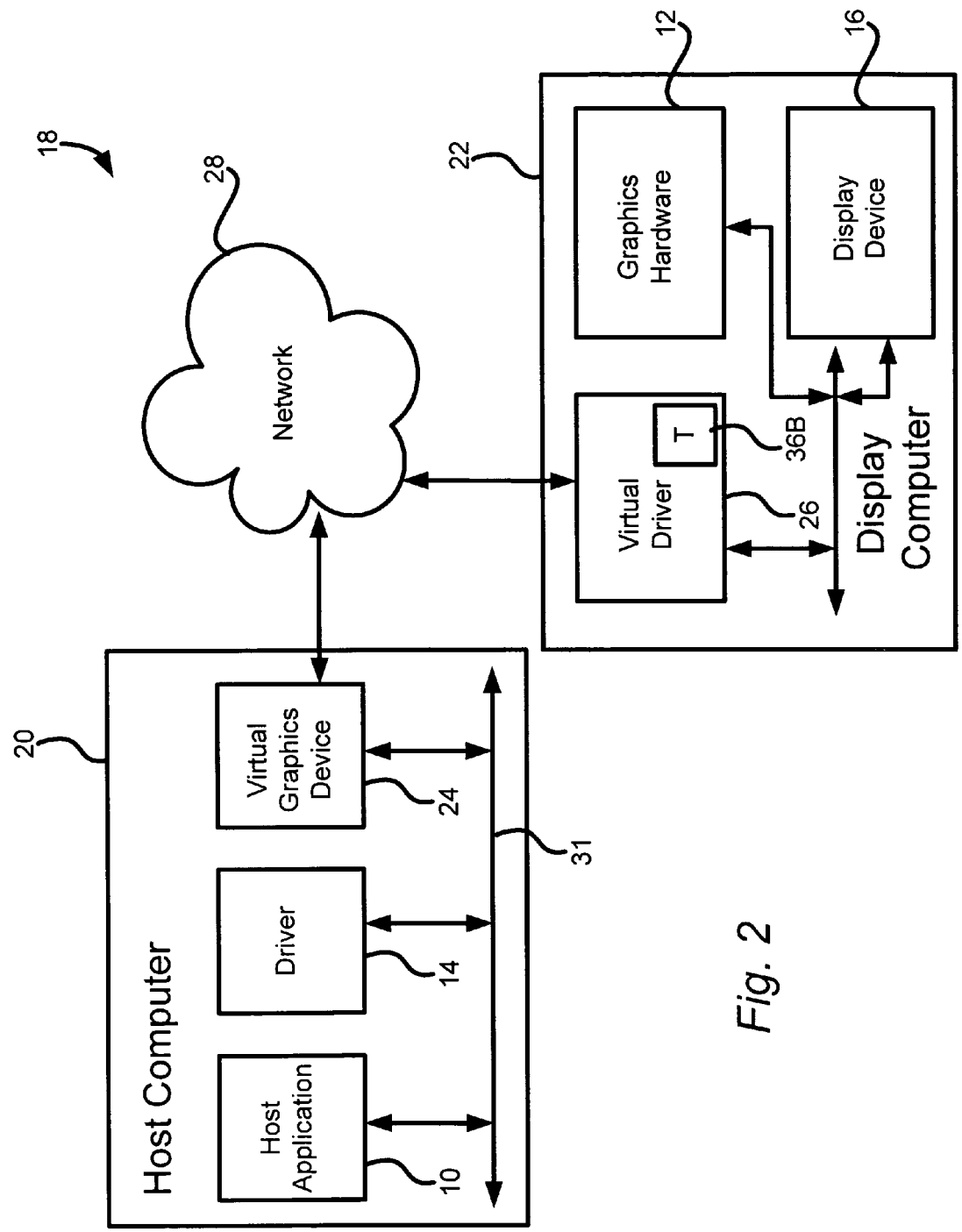
FIG. 2 schematically shows an illustrative graphics processing system implemented in accordance with illustrative embodiments of the invention.

FIG. 2 schematically shows an illustrative graphics processing system 18 implemented in accordance with illustrative embodiments of the invention. The system 18 includes a host computer 20 and a remote display computer 22 that cooperate to produce a graphical display. A host application 10 on the host computer 20 produces generalized function calls for subsequent processing by downstream graphics hardware 12 (e.g., a graphics card having a graphics accelerator with geometry and rasterization stages) on the display computer 22. Based on the host function calls, the downstream graphics hardware 12 generates image data for display on a display device 16 (e.g., a cathode ray tube display or a liquid crystal display).

Among other things, the host application 10 may be a graphical software package that implements the OPENGL standard, which was initially developed by Silicon Graphics, Inc. of Mountain View, Calif. It should be noted that discussion of such a software package is exemplary and thus, is not intended to limit all embodiments of the invention. Accordingly, various embodiments of the invention can be applied to other graphics processing types and standards (e.g., DIRECT3D and 2D graphics subsystems). In fact, some embodiments can be used with host applications that implement proprietary standards.

As known by those in the art and discussed in the Background of this document, the downstream graphics hardware 12 cannot read or process the generalized function calls produced by the host application 10. Accordingly, the host computer 20 has a translation device, known in the art as a "driver 14," to translate the generalized function calls to hardware specific calls that are readable by the graphics hardware 12. Unlike the generalized function calls produced by the host application 10, however, the driver 14 formats the hardware specific calls so that they can be transferred directly to the graphics hardware 12 without any special encoding, conversion or processing.

Illustrative embodiments take advantage of this by neither encoding nor decoding the hardware specific calls—it is not necessary for transmission to another computer. Instead, the system 18 simply forwards the hardware specific calls directly to the downstream graphics hardware 12 via a virtual link. To that end, the host computer 20 has a virtual graphics device 24 that cooperates with a virtual driver 26 on the display computer 22 through a virtual link across a network 28. In illustrative embodiments, the network 28 complies with one or both of a link layer or network layer protocol defined by the well known Open System Interconnection standard of the International Organization for Standards ("OSI standard" from the "ISO"). Exemplary networks may include the Internet, local area networks ("LANs"), and wide area networks ("WANs"). Discussion of specific networks for the virtual connection, however, is exemplary and not intended to limit the scope of various embodiments.

Figure 3:
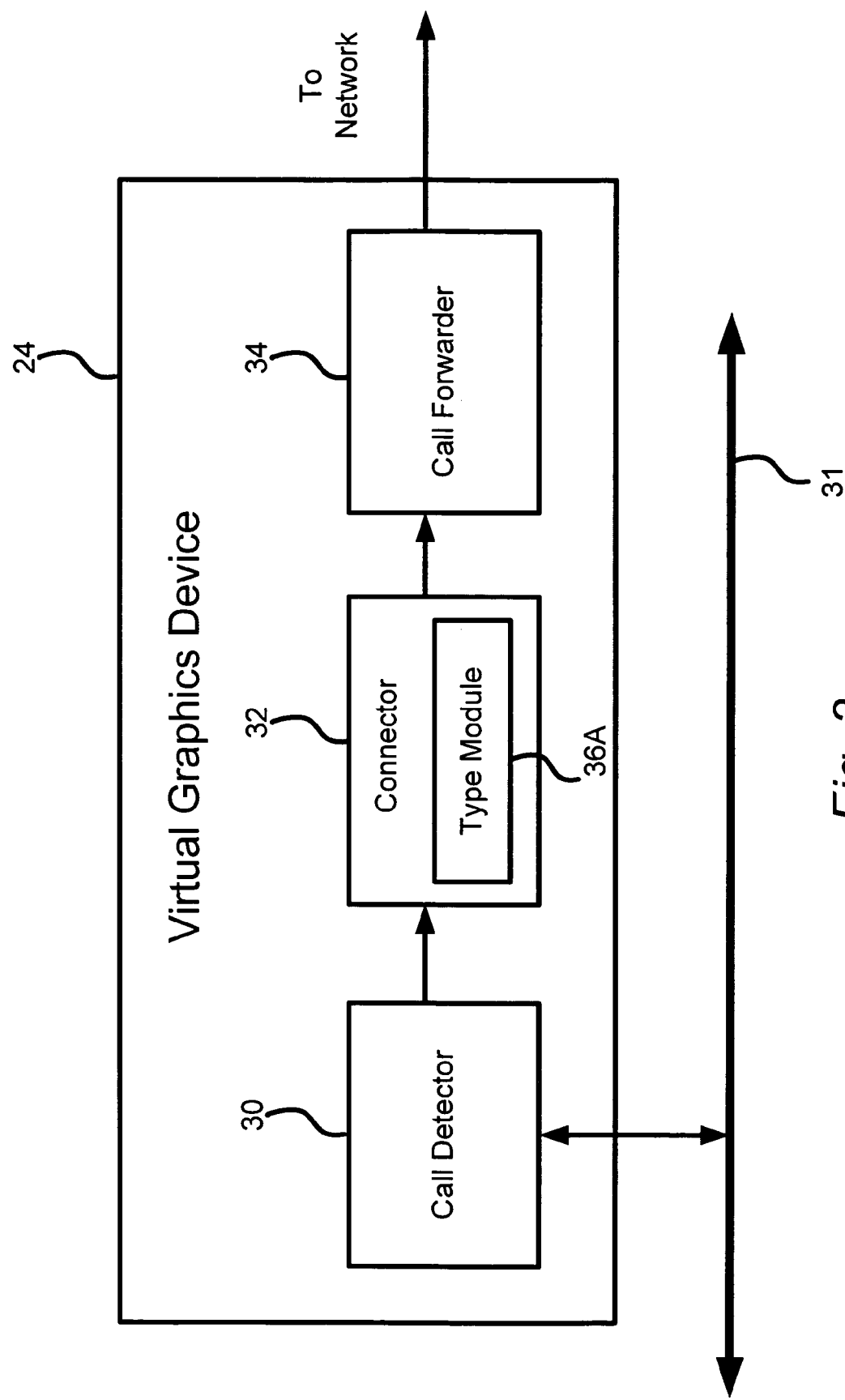
FIG. 3 schematically shows a virtual graphics device configured in accordance with one embodiment of the invention.
Figure 5:
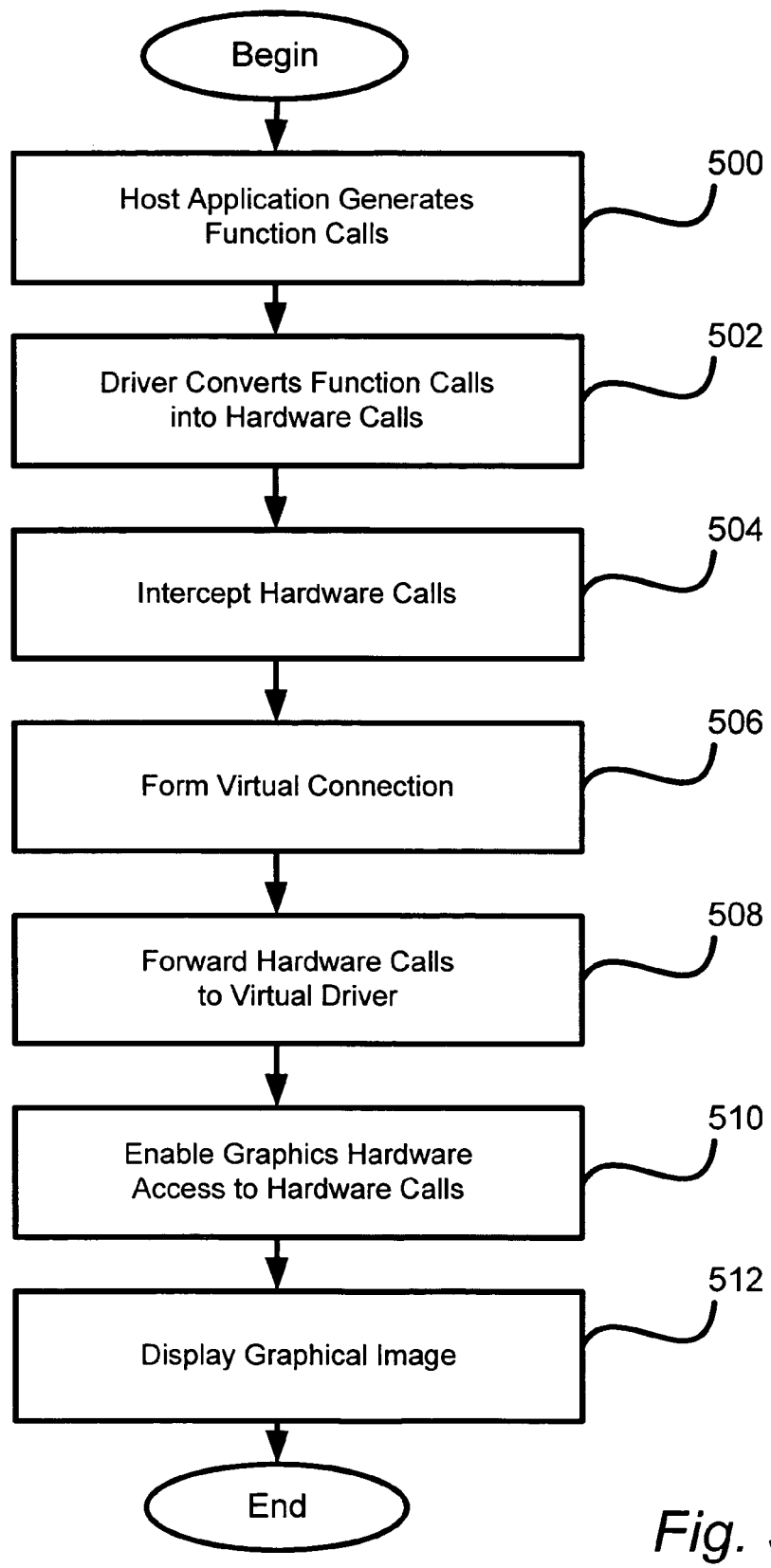
FIG. 5 shows an illustrative process of generating graphical data for display on the display device of FIG. 2.
Figure 6:
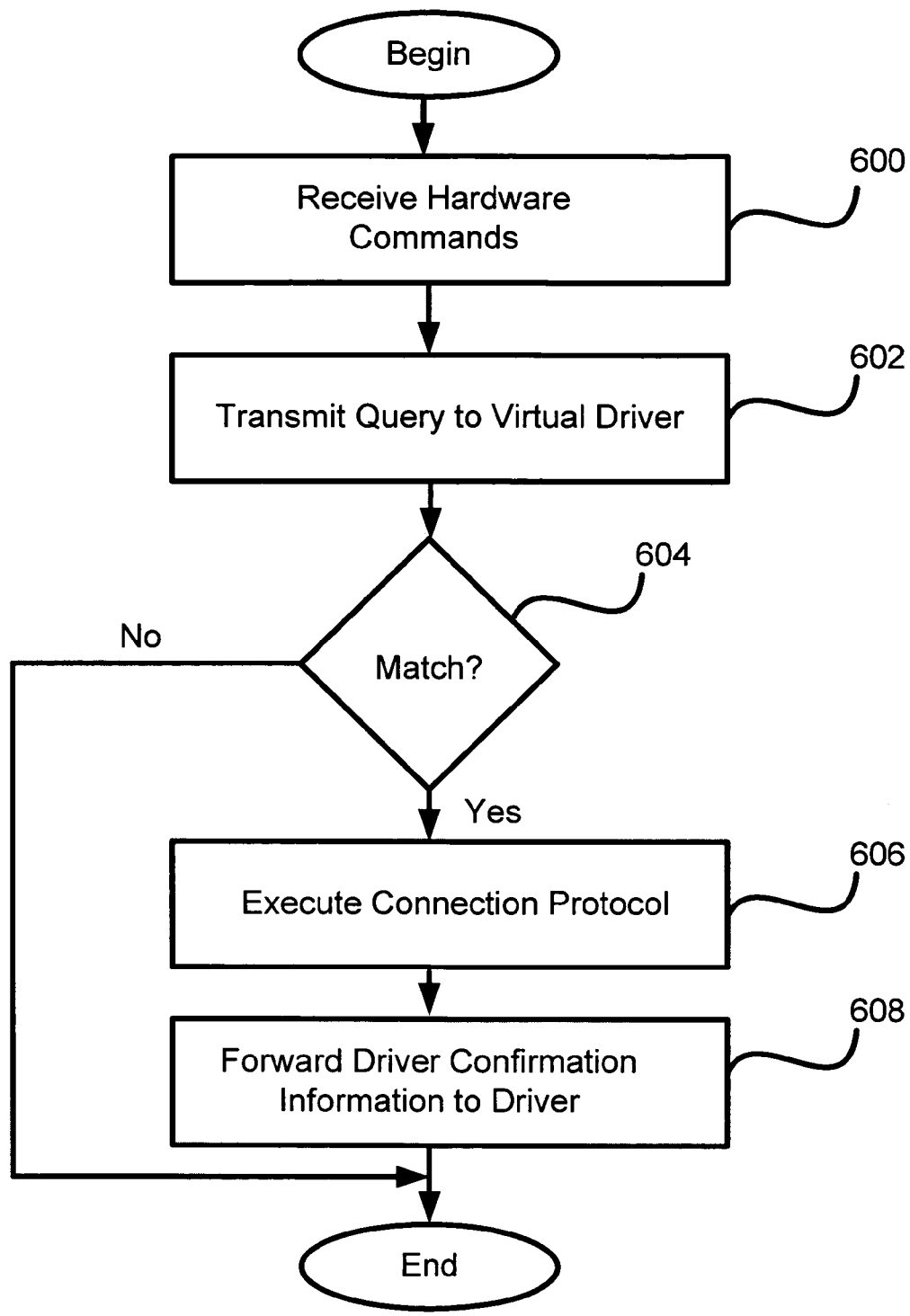
FIG. 6 shows an illustrative process of forming the virtual connection between the driver and graphics hardware shown in FIG. 2.

As discussed in greater detail with regard to FIGS. 5 and 6, the virtual graphics device 24 intercepts hardware specific calls from the driver 14 and coordinates with the virtual driver 26 to route them to the graphics hardware 12. FIG. 3 schematically shows various functional modules, within the virtual graphics device 24, for facilitating this process. Among other things, the virtual graphics device 24 has a call detector 30 that detects hardware calls produced by the driver 14 (e.g., by monitoring a system bus 31), a connector 32 for generating the virtual connection, and a call forwarder 34 for forwarding hardware specific calls to the graphics hardware 12. In addition, the virtual graphics device 24 also may have a type module 36A for determining the type of graphics hardware 12 that should receive the hardware specific calls. In a similar manner, the virtual driver 26 may also have a type module 36B for the same purpose (see FIG. 2). Details of the interaction of these functional modules are discussed in greater detail below with regard to FIGS. 5 and 6.

Figure 4:
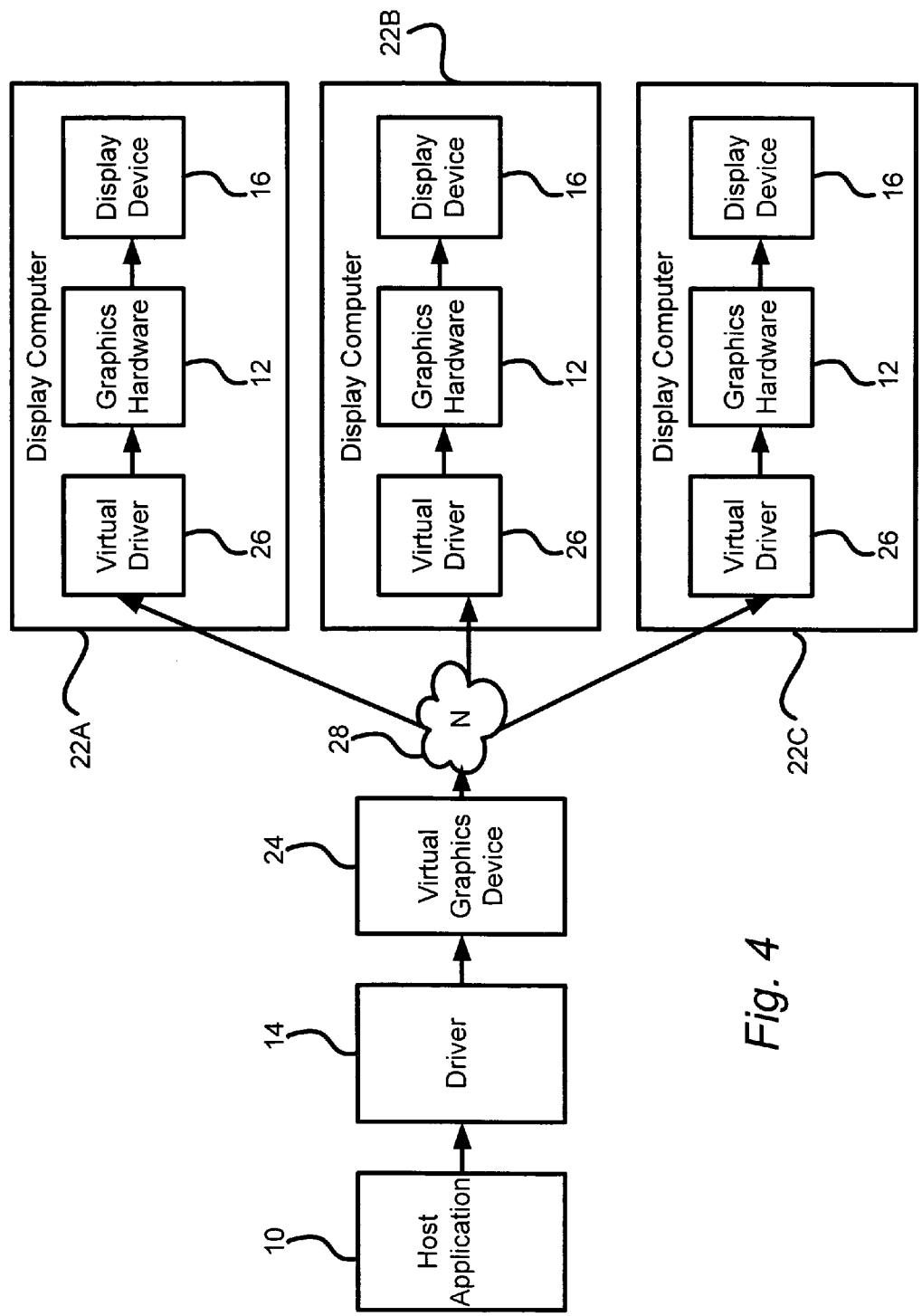
FIG. 4 schematically shows an exemplary parallel implementation of the graphics processing system shown in FIG. 2.

As suggested above, each box in the schematic diagram of FIG. 2 can represent one or more parallel modules. FIG. 4 shows one of many possible implementations that use parallel modules. Specifically, the virtual graphics device 24 forwards the hardware specific calls to three different display computers 20A-20C that each can simultaneously process and display the intended graphical data. Each display computer 22A-22C has a local virtual driver 26, graphics hardware 12, and display device 16. Of course, as noted, other implementations are possible. For example, the graphics hardware 12 may be distributed as a parallel array of graphics hardware modules that each process one tile of a single image. The system 18 then may converge to a single display device 16. Accordingly, discussion of single modules of FIG. 2 is a simplification and not intended to limit the scope of all embodiments.

FIG. 5 shows an illustrative process executed by the system 18 of FIG. 2 for generating and displaying graphical data. The process begins at step 500, in which the host application 10 generates OPENGL function calls. As noted above, these function calls typically refer to functions that are stored on the host computer 20. For example, they may point to some address in local memory.

The driver 14 receives these function calls and uses conventional methods to convert them into hardware specific calls that may be stored in a temporary output buffer (step 502). After the buffer is filled, the driver 14 may forward the hardware specific calls toward some graphics hardware 12. The call detector 30 monitoring the bus, however, intercepts those calls (step 504).

The process thus continues to step 506, in which the connector 32 forms the virtual (i.e., logical) connection with the graphics hardware 12 on the remote display computer 22. Details of one method of forming the virtual connection are discussed in greater detail with reference to FIG. 6.

After the connector 32 establishes the virtual connection, hardware specific calls may be freely transmitted from the host computer 20 to the display computer 22 (step 508). Any conventional means for forwarding the data to the display computer 22 may be used. For example, when used with a packet based network (e.g., an IP network, such as the Internet), an IP header may be appended directly to the hardware specific calls and forwarded across the Internet. No encoding is necessary. Accordingly, the virtual graphics device 24 bypasses graphics hardware on the host computer 20 by forwarding the hardware specific calls to the display computer 22.

After receipt, the virtual driver 26 removes the hardware specific calls from received packets (e.g., by stripping off the header and reassembling the data if broken into multiple packets) for storage in a temporary buffer. At this point in the process, the system 18 enables the graphics hardware 12 to access and process the hardware specific calls (step 510). Accordingly, in illustrative embodiments, the virtual driver 26 causes the display computer 22 to bypass local drivers 14, if any, on the display computer 22. Of course, no local driver 14 is necessary since the host computer 20 performs the driver functionality.

The graphics hardware 12 may be enabled to obtain such calls by various means. For example, the virtual driver 26 may affirmatively forward the data directly to the graphics hardware 12. Alternatively, the graphics hardware 12 may have the functionality to remove the calls from the temporary buffer (e.g., through a direct memory access operation). In illustrative embodiments, however, the graphics hardware 12 obtains the hardware specific calls substantially the same way it would obtain them if it were directly connected with the driver 14 in a single computer system.

As suggested above, the display computer 22 could have one or more different types of independent graphics hardware 12. For example, the display computer 22 could have a first graphics card from a first vendor, and a second graphics card from a second vendor. Hardware specific calls from the driver 14 of the first graphics card thus cannot be processed by the second graphics card. Accordingly, to ensure that the appropriate graphics hardware 12 receives the appropriate calls, the type module 36B on the virtual driver 26 determines the type of calls received, and enables the appropriate graphics hardware 12 to receive such calls.

The type module 36B may use conventional methods of determining the type of hardware. For example, when establishing the virtual connection, the virtual graphics device 24 may transmit a message identifying the type of graphics hardware 12 associated with specified incoming calls. This information may be stored locally on the display computer 22 and accessed to ensure that the appropriate graphics hardware 12 receives the calls. Alternatively, the virtual graphics device 24 may append hardware type information to the hardware specific calls. The type module 36B on the display computer 22 thus reads this information to determine which graphics hardware 12 is to receive the calls.

The process concludes at step 512 by displaying the graphical image on the display device 16.

As noted above, FIG. 6 shows a process of forming the virtual connection between the host computer 20 and display computer 22 as recited by step 506. The process begins at step 600, in which the call detector 30 receives the hardware specific calls generated by the driver 14. In response, the type module 36A within the connector 32 determines the type of driver 14 (i.e., the type of graphics hardware 12) and transmits a connection query to the virtual driver 26 on the display computer 22 (step 602). Among other things, the connection query can include, among other things, information relating to the graphics hardware type and a request to establish the virtual connection.

The virtual driver 26 then determines if the display computer 22 has the type of graphics hardware 12 specified in the connection query (i.e., determines if there is a "match, step 604"). If not, then the virtual driver 26 does not establish a virtual connection, thus ending the process. In some embodiments, the virtual driver 26 responsively replies with a reject message having information indicating that the display computer 22 does not have matching graphics hardware 12. Upon receipt of the reject message, the virtual graphics device 24 may generate a message identifying this as an error condition.

Conversely, if there is a match at step 604, then the virtual driver 26 and virtual graphics device 24 execute a conventional virtual connection 15 establishment protocol (step 606). Among other things, this may involve transferring information relating to identification information, data types to be transmitted, latency requirements, quality of service requirements, or network types.

Many conventional drivers 14 must receive some confirmation that they are communicating with the appropriate graphics hardware 12. Consequently, in some such embodiments, the virtual driver 26 may make system calls to the operating system, which produces hardware specific reply data. Receipt of the hardware specific reply data by the driver 14 confirms that it is communicating with the appropriate type of graphics hardware 12.

Accordingly, in illustrative embodiments, the virtual driver 26 makes the noted system calls to produce the hardware specific reply data. The virtual driver 26 then forwards this hardware specific reply data back to the virtual graphics device 24, which in turn forwards such data to the driver 14 (step 608). The driver 14 consequently operates as if it has a direct, hardwired connection with the graphics hardware 12. An error condition may result if the driver 14 does not receive the hardware specific reply data.

In some embodiments, this hardware specific reply data may be generated once and stored locally on the host computer 20. In that case, when a subsequent virtual connection is established, the virtual graphics device 24 simply forwards the reply data directly from local memory to the driver 14. No remote processing is required for this step, thus improving system speed. In other embodiments, however, the hardware specific reply data is generated each time the system 18 establishes a virtual connection. Although this embodiment reduces system speed when compared to the immediately preceding example, it is more robust. In yet other embodiments, both solutions can be combined to provide speed and robustness benefits.

Figure 7:
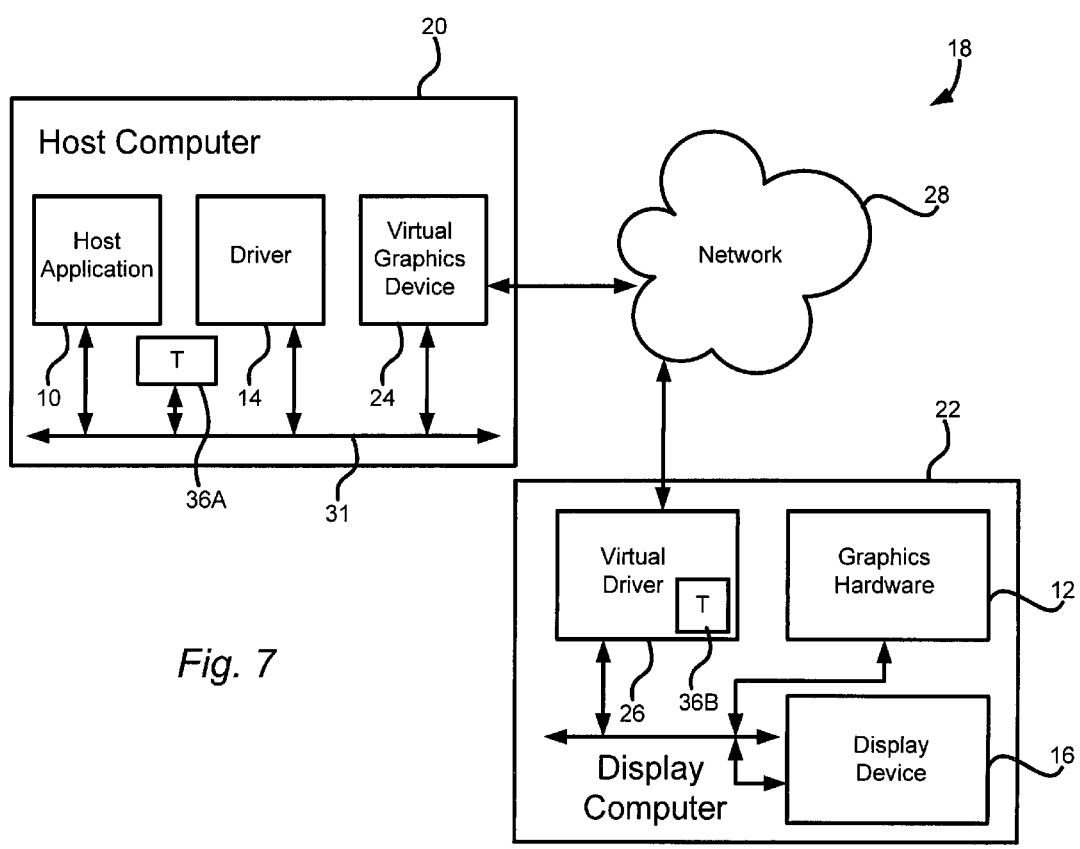
FIG. 7 schematically shows an alternative graphics processing system that may be implemented in accordance with various embodiments of the invention.
Figure 8:
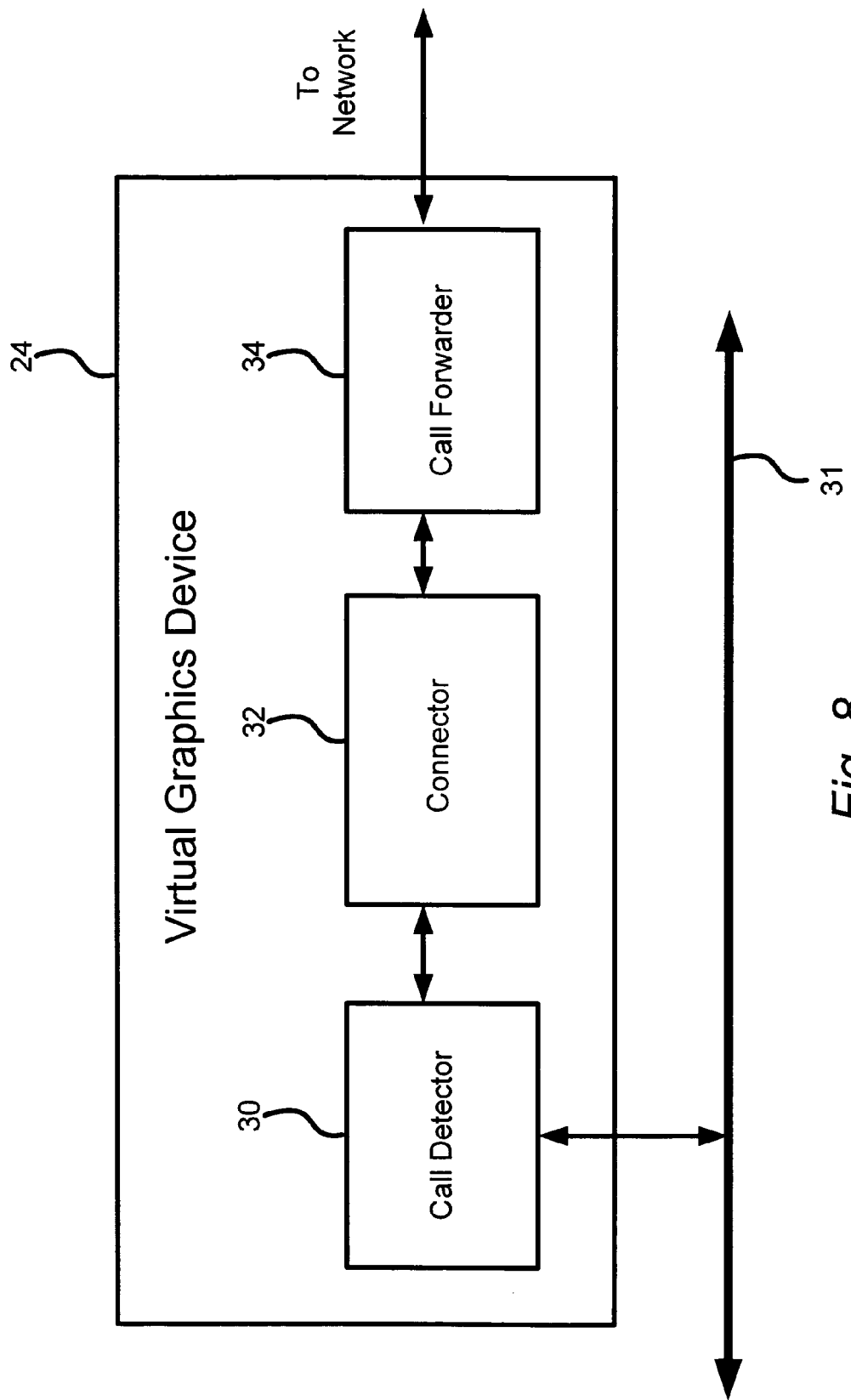
FIG. 8 schematically shows an alternative virtual graphics device configured in accordance with another embodiment of the invention.

Other arrangements of the components shown in FIGS. 2 and 3 can accomplish the same results by performing processes similar to those discussed above. For example, FIG. 7 schematically shows another graphics processing system 18 that may implement various embodiments of the invention, while FIG. 8 schematically shows another virtual graphics device 24 that also may implement various embodiments. For consistency, the reference numbers of like components in FIGS. 7 and 8 are the same as those in FIGS. 2 and 3.

One difference from the prior discussed embodiments of FIGS. 2 and 3 is that the type module 36A is coupled with a system bus 31 and thus, can process information before or after the driver 14. Consequently, rather than being limited to one type of driver 14, this embodiment enables the host computer 20 to select from a plurality of locally accessible drivers 14 based upon the static graphics hardware 12 on the display computer 22.

To that end, at some point before the any driver 14 receives function calls (i.e., before step 502 of FIG. 5), the type module 36A may transmit a preliminary query to the type module 36B on the remotely located virtual driver 26. This preliminary query essentially requests information relating to the type of graphics hardware 12 on the display computer 22. In response, the type module 36B on the virtual driver 26 replies with a response message identifying the type of graphics hardware 12. The type module 36B may determine this information from local stored data, or some conventional means for querying components on the display computer 22.

Upon receipt of the response message, the type module 36A loads the appropriate driver 14 for communicating with the remotely located graphics hardware 12. For example, the host computer 20 may have a type-A driver, a type-B driver, and a type-C driver. If the response message indicates that the graphics hardware 12 is type-B hardware, then the type module locates a type-B driver and loads it for execution. The system 18 may then continue processing in a manner similar to that described above.

These alternative steps create at least one additional difference from the above discussed processes of FIGS. 5 and 6. Specifically, when forming the virtual connection (i.e., step 506), some of the steps of FIG. 6 required to "match" the driver 14 and graphics hardware 12 may be skipped because the type modules 36A and 36B already have established the necessary type of driver 14. In some embodiments, however, matching steps may be repeated to ensure system accuracy. Moreover, in some embodiments, the virtual graphics device 24 and/or virtual driver 26 also are hardware specific, or have some hardware specific components. Accordingly, in addition to selecting and loading the appropriate type of driver 14, in some embodiments, the type module 36A also locates and loads an appropriate virtual graphics device 24.

The above discussed distributed graphics processing arrangements provide number of benefits. Specifically, unlike other distributed graphics processing arrangements, illustrative embodiments neither encode data to be transmitted, nor decode received data. Instead, the driver 14 simply produces the calls in a transmittable format, and the receiving display computer 22 simply uses the data as received.

In addition, drivers 14 often generate hardware specific calls in an optimized format. Accordingly, rather than simply transmitting data as produced by some functional module (e.g., from the host application 10), illustrative embodiments transmit optimized calls (i.e., from the driver 14). In fact, when the driver 14 is replaced or upgraded, its improved functionality should further improve system performance.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other things, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of processing graphical data in a distributed system having a first computer including a first graphics hardware and a driver, and a second computer including a second graphics hardware, the driver producing a hardware call for controlling the operation of the second graphics hardware, the method comprising:

determining the type of the second graphics hardware;
    establishing a virtual connection between the driver and the second graphics hardware based upon the determined type of the second graphics hardware; and forwarding the hardware call to the second graphics hardware via the virtual connection, bypassing the first graphics hardware and without encoding the hardware call.

2. The method as defined by claim 1 further comprising intercepting the hardware call from the driver before forwarding it to the second graphics hardware via the virtual connection.

3. The method as defined by claim 1 wherein forwarding includes adding address information to the hardware call.

4. The method as defined by claim 1 wherein the virtual connection includes the Internet.

5. A computer program product for processing graphical data in a computer system having a first computer including a first graphics hardware and a driver, and a second computer including a second graphics hardware, the driver producing a hardware call for controlling the operation of the second graphics hardware, the computer program product comprising a tangible computer readable storage medium having computer readable program code thereon, the computer readable program code comprising:
   program code for determining the type of the second graphics hardware;
   program code for establishing a virtual connection between the driver and the second graphics hardware based upon the determined type of the second graphics hardware; and
   program code for forwarding the hardware call to the second graphics hardware via the virtual connection, bypassing the first graphics hardware and without encoding the hardware call.

6. The computer program product as defined by claim 5 further comprising program code for intercepting the hardware call from the driver before forwarding it to the second graphics hardware via the virtual connection.

7. The computer program product as defined by claim 5 wherein the program code for forwarding includes program code for adding address information to the hardware call.

8. The computer program product as defined by claim 5 wherein the virtual connection includes the Internet.

9. An apparatus including at least one processor for processing graphical data in a distributed system having a first computer including a first graphics hardware and a driver, and a second computer including a second graphics hardware, the driver producing a hardware call for controlling the operation of the second graphics hardware, the apparatus comprising:
   a call detector for detecting the hardware call produced by the driver;
   a hardware type module configured to determine the type of the second graphics hardware;
   a connector operatively coupled with the call detector, the connector being configured to form a virtual connection between the driver and the second graphics hardware based upon the type of the second graphics hardware determined by the hardware type module, after the call detector detects the hardware call produced by the driver; and
   a call forwarder comprising hardware operatively coupled with the connector, the call forwarder being configured to forward the hardware call to the second graphics hardware via the virtual connection, bypassing the first graphics hardware and without encoding the hardware call.

10. The apparatus as defined by claim 9 further comprising an interceptor configured to intercept the hardware call from the driver before the call forwarder forwards it to the second graphics hardware via the virtual connection.

11. The apparatus as defined by claim 9 further including an addresser configured to add address information to the hardware call.

12. The apparatus as defined by claim 9 wherein the virtual connection includes the Internet.

13. A method of processing graphical data in a system having a first device including a first driver and a second device including a second driver and graphics hardware, the first driver producing a hardware call for controlling the operation of the graphics hardware, the method comprising:
   receiving a query to establish a virtual connection between the first driver and the graphics hardware;
   determining the type of the graphics hardware that is associated with the query;
   establishing the virtual connection between the first driver and the graphics hardware based on the determined type of the graphics hardware;
   receiving the hardware call via the virtual connection; and
   enabling the graphics hardware to process the hardware call, bypassing the second driver and without decoding the hardware call.

14. The method as defined by claim 13 wherein enabling includes forwarding the hardware call to the graphics hardware.

15. The method as defined by claim 13 wherein enabling includes storing the hardware call in memory that is accessible by the graphics hardware.

16. The method as defined by claim 13 further including forwarding a confirmation message to the first driver, the confirmation message having information indicating that the graphics hardware is a specific type of graphics hardware.

17. The method as defined by claim 13 wherein the virtual connection includes the Internet.

18. A computer program product for processing graphical data in a computer system having a first device including a first driver, and a second device including a second driver and graphics hardware, the first driver producing a hardware call for controlling the operation of the graphics hardware, the computer program product comprising a tangible computer readable storage medium having computer readable program code thereon, the computer readable program code comprising:
   program code for receiving a query to establish a virtual connection between the first driver and the graphics hardware;
   program code for determining the type of the graphics hardware that is associated with the query;
   program code for establishing the virtual connection between the first driver and the graphics hardware based on the determined type of the graphics hardware;
   program code for receiving the hardware call via the virtual connection; and
   program code for enabling the graphics hardware to process the hardware call, bypassing the second driver and without decoding the hardware call.

19. The computer program product as defined by claim 18 wherein the program code for enabling includes program code for forwarding the hardware call to the graphics hardware.

20. The computer program product as defined by claim 18 wherein the program code for enabling includes program code for storing the hardware call in memory that is accessible by the graphics hardware.

21. The computer program product as defined by claim 18 further including program code for forwarding a confirmation message to the first driver, the confirmation message having information indicating that the graphics hardware is a specific type of graphics hardware.

22. The computer program product as defined by claim 18 wherein the virtual connection includes the Internet.

23. An apparatus including at least one processor for processing graphical data in a system having a first computer including a first driver, and a second computer including a second driver and graphics hardware, the first driver producing a hardware call for controlling the operation of the graphics hardware, the apparatus comprising:

means for receiving a query to establish a virtual connection between the first driver and the graphics hardware;

a hardware type module operatively coupled with the receiving means, the hardware type module being configured to determine the type of graphics hardware that is associated with the query;

a connector configured to establish the virtual connection between the first driver and the graphics hardware based on the determined type of the graphics hardware; and a hardware interface configured to receive the hardware call via the virtual connection, the graphics hardware being operatively coupled with the interface to receive the hardware call, bypassing the second driver and without decoding the hardware call.

24. The apparatus as defined by claim 23 further including a forwarding module configured to forward the hardware call to the graphics hardware.

25. The apparatus as defined by claim 23 further including memory for storing the hardware call, the memory being accessible by the graphics hardware.

26. The apparatus as defined by claim 23 further wherein the connector is configured to forward a confirmation message to the first driver, the confirmation message having information indicating that the graphics hardware is a specific type of graphics hardware.

27. The apparatus as defined by claim 23 wherein the virtual connection includes the Internet.

\* \* \* \* \*